US012014641B2

United States Patent
Wake et al.

(10) Patent No.: US 12,014,641 B2
(45) Date of Patent: Jun. 18, 2024

(54) AGRICULTURAL DRONE HAVING IMPROVED FOOLPROOF

(71) Applicant: NILEWORKS INC., Tokyo (JP)

(72) Inventors: Chihiro Wake, Tokyo (JP); Hiroshi Yanagishita, Tokyo (JP)

(73) Assignee: NILEWORKS INC., Tokyo (JP)

( * ) Notice: Subject to any disclaimer, the term of this patent is extended or adjusted under 35 U.S.C. 154(b) by 738 days.

(21) Appl. No.: 17/047,736

(22) PCT Filed: Feb. 28, 2019

(86) PCT No.: PCT/JP2019/007732
§ 371 (c)(1),
(2) Date: Oct. 28, 2020

(87) PCT Pub. No.: WO2019/168080
PCT Pub. Date: Sep. 6, 2019

(65) Prior Publication Data
US 2021/0110724 A1    Apr. 15, 2021

(30) Foreign Application Priority Data

Feb. 28, 2018  (JP) .................................. 2018-035043

(51) Int. Cl.
*G08G 5/00*    (2006.01)
*B64C 39/02*   (2023.01)
(Continued)

(52) U.S. Cl.
CPC ......... *G08G 5/0065* (2013.01); *B64C 39/024* (2013.01); *G05D 1/102* (2013.01);
(Continued)

(58) Field of Classification Search
CPC ...... G08G 5/0065; G08G 5/0069; G08G 5/04; G05D 1/106; G05D 1/102; B64C 39/024; B64U 10/13; B64U 2101/00
See application file for complete search history.

(56) References Cited

U.S. PATENT DOCUMENTS 9,944,404 B1 * 4/2018 Gentry ................. G07C 5/0816
10,410,291 B1 * 9/2019 Binion .................. G06Q 40/08
(Continued)

FOREIGN PATENT DOCUMENTS

| CN | 103592947 A | 2/2014 |
| CN | 107015570 A | 8/2017 |

(Continued)

OTHER PUBLICATIONS

International Search Report and Written Opinion PCT/JP2019/007732 dated May 21, 2019.

*Primary Examiner* — Hussein Elchanti
(74) *Attorney, Agent, or Firm* — MATTINGLY & MALUR, PC

(57) ABSTRACT

A drone (an aerial vehicle), able to maintain improved safety for operation by non-specialists, is provided. A farm field data stored in a cloud at take-off is compared to an environment data read by a sensor, and a control to prohibit take-off is performed if any danger is considered. In particular, it is desirable to prohibit if there is a traffic, where people and cars may pass, between the farm field and a current location, and if a direction of the drone, installed, does not point to a direction of an intrusion pathway to the target farm field. Furthermore, it is desirable to prohibit take-off if a predetermined maintenance is not performed by referring to a maintenance history.

8 Claims, 5 Drawing Sheets

(51) Int. Cl.
*G05D 1/00* (2006.01)
*G08G 5/04* (2006.01)
*B64U 10/13* (2023.01)
*B64U 101/00* (2023.01)

(52) U.S. Cl.
CPC .......... *G05D 1/106* (2019.05); *G08G 5/0069* (2013.01); *G08G 5/04* (2013.01); *B64U 10/13* (2023.01); *B64U 2101/00* (2023.01)

(56) References Cited

U.S. PATENT DOCUMENTS

| | | | | |
|---|---|---|---|---|
| 2015/0254988 | A1* | 9/2015 | Wang | G08G 5/0021 701/3 |
| 2016/0307447 | A1* | 10/2016 | Johnson | H04B 7/18506 |
| 2017/0129603 | A1* | 5/2017 | Raptopoulos | G08G 5/0069 |
| 2017/0225801 | A1* | 8/2017 | Bennett | B64F 1/222 |
| 2017/0261998 | A1 | 9/2017 | Wang | |
| 2018/0096609 | A1* | 4/2018 | de la Cruz | G08G 5/0043 |
| 2018/0244387 | A1* | 8/2018 | Russell | G08G 5/0021 |
| 2018/0245365 | A1 | 8/2018 | Wankewycz | |
| 2018/0253093 | A1 | 9/2018 | Augugliaro et al. | |
| 2018/0259342 | A1* | 9/2018 | Bitra | G01C 21/188 |
| 2018/0279105 | A1* | 9/2018 | Huber | H04W 4/025 |
| 2018/0290763 | A1* | 10/2018 | Huang | G08G 5/003 |
| 2020/0209895 | A1* | 7/2020 | Wang | G05D 1/106 |

FOREIGN PATENT DOCUMENTS

| | | |
|---|---|---|
| JP | 2001-120151 A | 5/2001 |
| JP | 2017-520751 A | 7/2017 |
| JP | 2017-163265 A | 9/2017 |
| WO | 2017/029611 A1 | 2/2017 |
| WO | 2017/149451 A2 | 9/2017 |

* cited by examiner

AGRICULTURAL DRONE HAVING IMPROVED FOOLPROOF

TECHNICAL FIELD

The present invention relates to an aerial vehicle (drone), in particular, a drone with improved safety for operation by non-specialists, and a control method and a control program therefor.

BACKGROUND ART

An application of small helicopters (multicopters) generally called drones is in progress. One of the important fields of application thereof is the spraying of chemicals such as pesticides or liquid fertilizers to a farmland (farm field) (for example, Patent Literature 1). In Japan where the farmland is smaller than in the Europe and the U.S., drones are more suitable than manned airplanes and helicopters in many cases.

Technologies such as a Quasi-Zenith Satellite System and a Real Time Kinematic-Global Positioning System (RTK-GPS) allow a drone to accurately know the absolute position of the own plane in centimeters during flight. Thus, even in the typical small and complex farmland in Japan, it is possible to fly a drone autonomously with minimum manual control and to spray chemicals efficiently and accurately.

On the other hand, in some cases, safety considerations were not sufficient for autonomous drones intended for spraying agricultural chemicals. Since a drone loaded with chemicals weighs several tens of kilograms, a case of an accident such as falling onto a person may have serious consequences. Further, the operator of a drone is usually not an expert, so therefore a foolproof mechanism is required, but the consideration for this was insufficient. Until now, there have been drone safety technologies based on human control (for example, Patent Literature 2), but there was no technology for addressing safety issues specific to autonomous drones for spraying agricultural chemicals.

CITATION LIST

Patent Literature

Patent Literature 1: JP 2001-120151 A
Patent Literature 2: JP 2017-163265 A

SUMMARY OF INVENTION

Technical Problem

A drone (aerial vehicle) that is able to maintain high level of safety even for operation by non-specialists is provided.

Solution to Problem

In the present invention, the above-described problem is solved by providing a drone. The drone includes a position acquisition unit, a flight area determination unit, and a flight control unit. In the drone, the position acquisition unit acquires an own position at take-off. The flight area determination unit compares a flight area information and an intrusion pathway information stored in a flight area information storage to the acquired own position. The flight control unit prohibits take-off when the acquired own position is in outside of a target area of the flight area information, when a trafficway is on the intrusion pathway, or when an obstacle is on the intrusion pathway.

Further, in the present invention, the above-described problem is solved by providing a drone. The drone includes a direction acquisition unit, a position acquisition unit, a flight area determination unit and a flight control unit. In the drone, the direction acquisition unit acquires an own direction at take-off. The position acquisition unit acquires an own position at take-off. The flight area determination unit compares the acquired own position to an intrusion pathway information stored in a flight area information storage. The flight control unit prohibits take-off when the acquired own direction is different from a direction of the intrusion pathway.

Further, in the present invention, the above-described problem is solved by providing a drone. The drone includes a maintenance time storage, an operation time storage, and a flight control unit. In the drone, the flight control unit acquires a last maintenance time from the maintenance time storage. The flight control unit prohibits take-off when a first predetermined time passes over the last maintenance time, when a second predetermined time passes over a total operation time from the last maintenance time acquired from the operation time storage, or when a second predetermined time passes over a total flight time from the last maintenance time acquired from the operation time storage.

Further, in the present invention, the above-described problem is solved by providing a drone. The drone includes an environment information acquisition unit and a flight control unit. In the drone, the flight control unit does not send a startup command to a motor or a pump when a temperature, a battery temperature, or an altitude acquired from the environment information acquisition unit on startup by the flight control unit is out of a specified range.

Further, in the present invention, the above-described problem is solved by providing a drone control method. The drone control method includes a step of acquiring an own position at take-off. The drone control method includes a step of comparing the acquired own position to a flight area information and an intrusion pathway information stored in a flight area information. The drone control method includes a step of prohibiting take-off when the acquired own position is in outside of a target area of the flight area information, when a trafficway is on the intrusion pathway, or when an obstacle is on the intrusion pathway.

Further, in the present invention, the above-described problem is solved by providing a drone control method. The drone control method includes a step of acquiring an own direction at take-off. The drone control method includes a step of acquiring an own position at take-off. The drone control method includes a step of comparing the acquired own position to a flight area information stored in a flight area information storage. The drone control method includes a step of prohibiting take-off when the acquired own direction is different from a direction of the intrusion pathway.

Further, in the present invention, the above-described problem is solved by providing a drone control method. The drone control method includes a step of acquiring a last maintenance time from a maintenance time storage. The drone control method includes a step of acquiring a total flight time from the last maintenance time acquired from an operation time storage. The drone control method includes a step of prohibiting take-off when a first predetermined time passes over the last maintenance time, or when a second predetermined time passes over the total flight time from the last maintenance time acquired from the operation time storage.

Further, in the present invention, the above-described problem is solved by providing a drone control method. The drone control method includes a step of acquiring any of a temperature, a battery temperature, or an altitude. The drone control method includes a step of prohibiting sending out a startup command to a motor or a pump when any of the temperature, the battery temperature, or the altitude, acquired, is out of a specified range.

Further, in the present invention, the above-described problem is solved by providing a drone control program. The drone control program causes a computer to execute a step of acquiring an own position at take-off. The drone control program causes a computer to execute a step of comparing the acquired own position to a flight area information and an intrusion pathway information stored in a flight area information. The drone control program causes a computer to execute a step of prohibiting take-off when the acquired own position is in outside of a target area of the flight area information, when a trafficway is on the intrusion pathway, or when an obstacle is on the intrusion pathway.

Further, in the present invention, the above-described problem is solved by providing a drone control program. The drone control program causes a computer to execute a step of acquiring an own direction at take-off. The drone control program causes a computer to execute a step of acquiring an own position at take-off. The drone control program causes a computer to execute a step of comparing the acquired own position to an intrusion pathway information stored in a flight area information storage. The drone control program causes a computer to execute a step of prohibiting take-off when the acquired own direction is different from a direction of the intrusion pathway.

Further, in the present invention, the above-described problem is solved by providing a drone control program. The drone control program causes a computer to execute a step of acquiring a last maintenance time from a maintenance time storage. The drone control program causes a computer to execute a step of acquiring a total flight time from the last maintenance time acquired from an operation time storage. The drone control program causes a computer to execute a step of prohibiting take-off when a first predetermined time passes over the last maintenance time, or when a second predetermined time passes over the total flight time from the last maintenance time acquired from the operation time storage.

Further, in the present invention, the above-described problem is solved by providing a drone control program. The drone control program causes a computer to execute a step of acquiring any of a temperature, a battery temperature, or an altitude. The drone control program causes a computer to execute a step of prohibiting sending out a startup command to a motor or a pump when any of the temperature, the battery temperature, or the altitude, acquired, is out of a specified range.

Incidentally, the computer program can be provided by being downloaded via a network such as the Internet, or can be provided by being recorded in various computer-readable recording media such as a CD-ROM.

Advantageous Effects of Invention

A drone (aerial vehicle) that is able to maintain high level of safety even for operation by non-specialists is provided.

DESCRIPTION OF EMBODIMENTS

Hereinafter, modes for carrying out the present invention will be described with reference to the drawings. The drawings are all examples.

Figure 1:
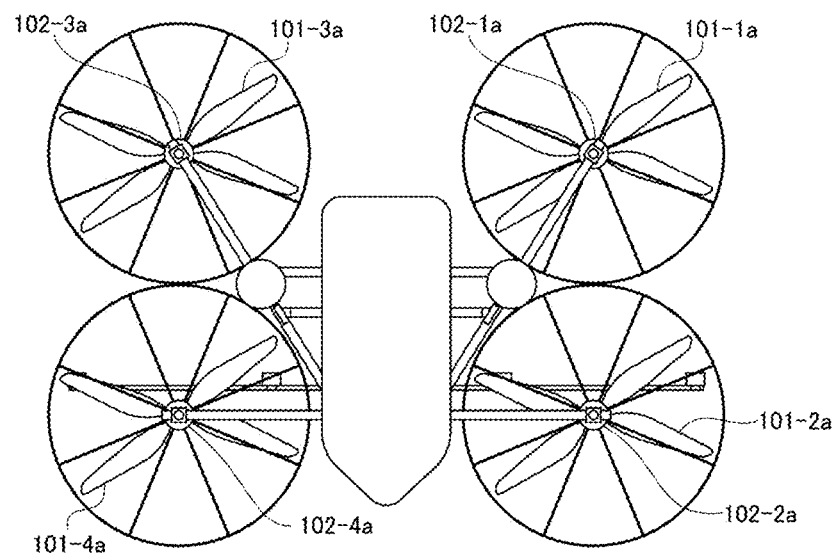
FIG. 1 is a plan view of an embodiment of a drone according to the present invention.
Figure 2:
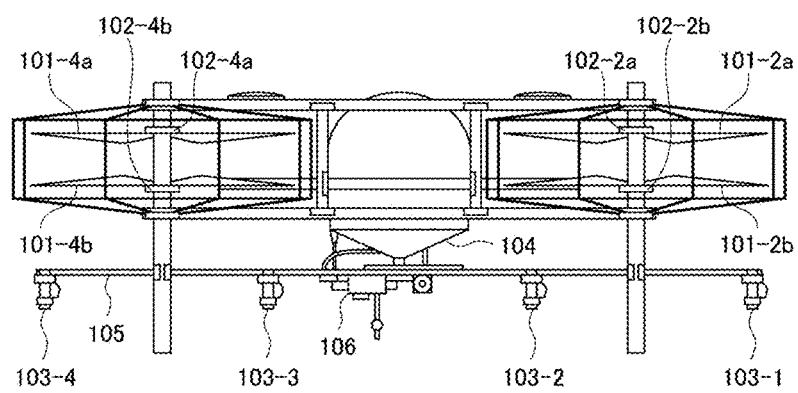
FIG. 2 is a front view of the embodiment of the drone according to the present invention.
Figure 3:
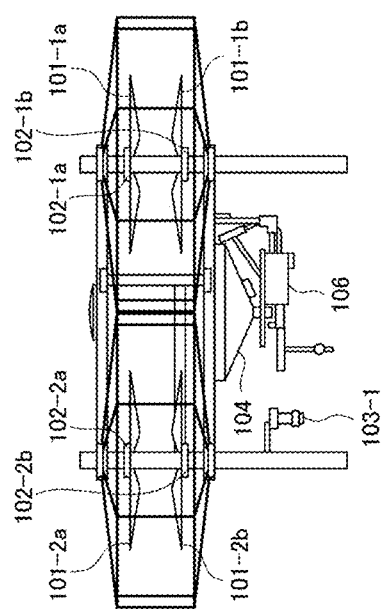
FIG. 3 is a right side view of the embodiment of the drone according to the present invention.

FIG. 1 is a plan view of an embodiment of a drone (100) according to the present invention, FIG. 2 is a front view (viewed from a traveling direction side), and FIG. 3 is a right side view thereof. Incidentally, in this description, a drone is defined as a general aerial vehicle having multiple rotor blades or flight units, regardless of a power means (electric power, prime mover, or the like), an operating system (wireless or wired, autonomous or manual flight type, or the like).

Rotor blades (101-1a, 101-1b, 101-2a, 101-2b, 101-3a, 101-3b, 101-4a, and 101-4b) (also called rotors) are units for flying the drone (100). It is desirable that eight rotor blades (four sets of two-stage rotor blades) are provided in consideration of the balance of flight stability, airframe size, and battery consumption.

Motors (102-1a, 102-1b, 102-2a, 102-2b, 102-3a, 102-3b, 102-4a, and 102-4b) are units (which are typically an electric motor but may be a motor or the like) for rotating the rotor blades (101-1a, 101-1b, 101-2a, 101-2b, 101-3a, 101-3b, 101-4a, and 101-4b), and it is desirable that one motor be installed in one rotor blade. In the upper and lower rotor blades (for example, 101-1a and 101-1b) and the corresponding motors (for example, 102-1a and 102-1b) in one set, desirably, axes are collinear and rotate in directions opposite to each other for the flight stability of the drone. Incidentally, although a part of the rotor blades (101-3b) and a part of the motors (102-3b) are not illustrated, their positions are obvious, and are illustrated if there is a left side view. As illustrated in FIGS. 2 and 3, desirably, a radial member for supporting a propeller guard, which is provided such that a rotor blade does not interfere with foreign matters, is desirably not horizontal but a roof structure. The structure promotes the buckling of the member to the outside of the rotor blade at the time of collision to prevent the member from interfering with the rotor.

Chemical nozzles (103-1, 103-2, 103-3, and 103-4) are units for spraying chemicals downward, and four chemical nozzles are preferably provided. Incidentally, in this description, the chemicals are generally referred to as liquids or powders sprayed on farm field such as pesticides, herbicides, liquid fertilizers, insecticides, seeds, and water.

A chemical tank (104) is a tank for storing chemicals to be sprayed, and is preferably provided at a position close to the center of gravity of the drone (100) and lower than the center of gravity from the viewpoint of weight balance.

Chemical hoses (105-1, 105-2, 105-3, and 105-4) are units for connecting the chemical tank (104) with respective chemical nozzles (103-1, 103-2, 103-3, and 103-4). The chemical hoses are made of a hard material and may also serve to support the chemical nozzle. A pump (106) is a unit for discharging the chemicals from the nozzle.

Figure 4:
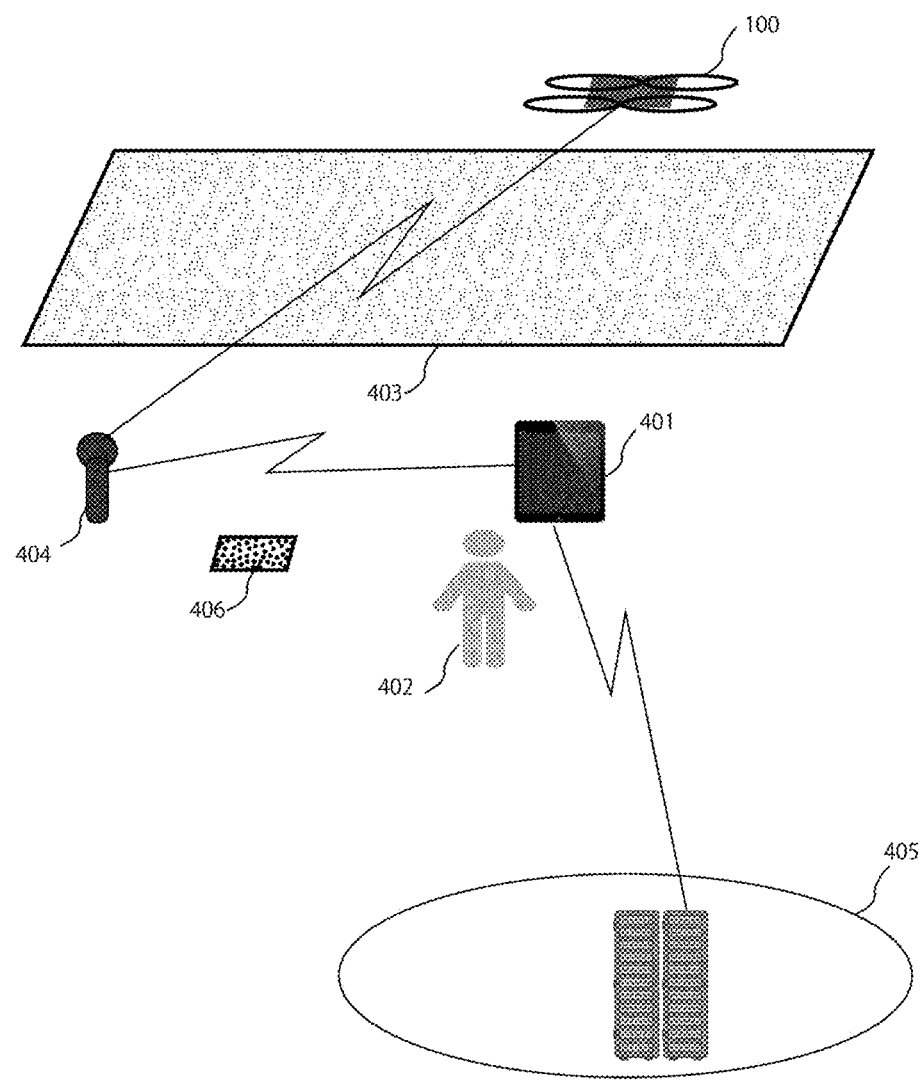
FIG. 4 is an example of an overall conceptual view of a chemical spraying system using the embodiment of the drone according to the present invention.

FIG. 4 illustrates an overall conceptual view of a system using an embodiment of a chemical spraying application of the drone (100) according to the present invention. This drawing is a schematic view, and the scale is not accurate. A remote controller (401) is a unit for transmitting a command to the drone (100) by the operation of a user (402) and displaying information (for example, a position, a chemical amount, a battery level, and a camera image) received from the drone (100). The remote controller may be realized by a portable information device such as a general tablet terminal for operating a computer program. It is desirable that the drone (100) according to the present invention be controlled to perform autonomous flight. However, a manual operation is desirably performed at the time of basic operation such as take-off and return and at the time of emergency. In addition to portable information devices, an emergency operation device (not illustrated) having an exclusive emergency stop function may be used (desirably, the emergency operation device is a dedicated device which is equipped with a large emergency stop button or the like so as to be able to respond quickly in case of emergency). It is desirable that the remote controller (401) and the drone (100) perform wireless communication by Wi-Fi or the like.

A farm field (403) is a rice field, an upland field, or the like targeted for chemical spraying by the drone (100). Actually, the topography of the farm field (403) is complicated, and there is a case where the topographic map cannot be obtained in advance, or the topographic map and the situation of the site are inconsistent. Usually, the farm field (403) is adjacent to a house, a hospital, a school, a farm field for other crops, a road, a railroad, and the like. Further, there may also be obstacles such as buildings and electric wires in the farm field (403).

A base station (404) is a device which provides a master unit function of Wi-Fi communication and the like. Desirably, the base station also functions as an RTK-GPS base station to provide the accurate position of the drone (100) (the master unit function of Wi-Fi communication and the RTK-GPS base station may be independent devices). A farm cloud (405) is typically a group of computers operated on a cloud service and related software, and it is desirable that the farm cloud (405) is wirelessly connected to the remote controller (401) via a mobile phone line or the like. The farm cloud (405) may analyze the image of the farm field (403) photographed by the drone (100), grasp the growth status of crops, and perform processing for determining a flight route. Further, the drone (100) may be provided with the stored topographical information or the like of the farm field (403). In addition, the history of the flight of the drone (100) and photographed images may be accumulated to perform various analysis processes.

Usually, the drone (100) takes off from a landing point (406) outside the farm field (403), and returns to the landing point (406) after spraying chemicals on the farm field (403), or when it becomes necessary to replenish the chemicals or charge. A flight route (entry route) from the landing point (406) to the target farm field (403) may be stored in advance in the farm cloud (405) or the like, or may be inputted by the user (402) before starting take-off.

Figure 5:
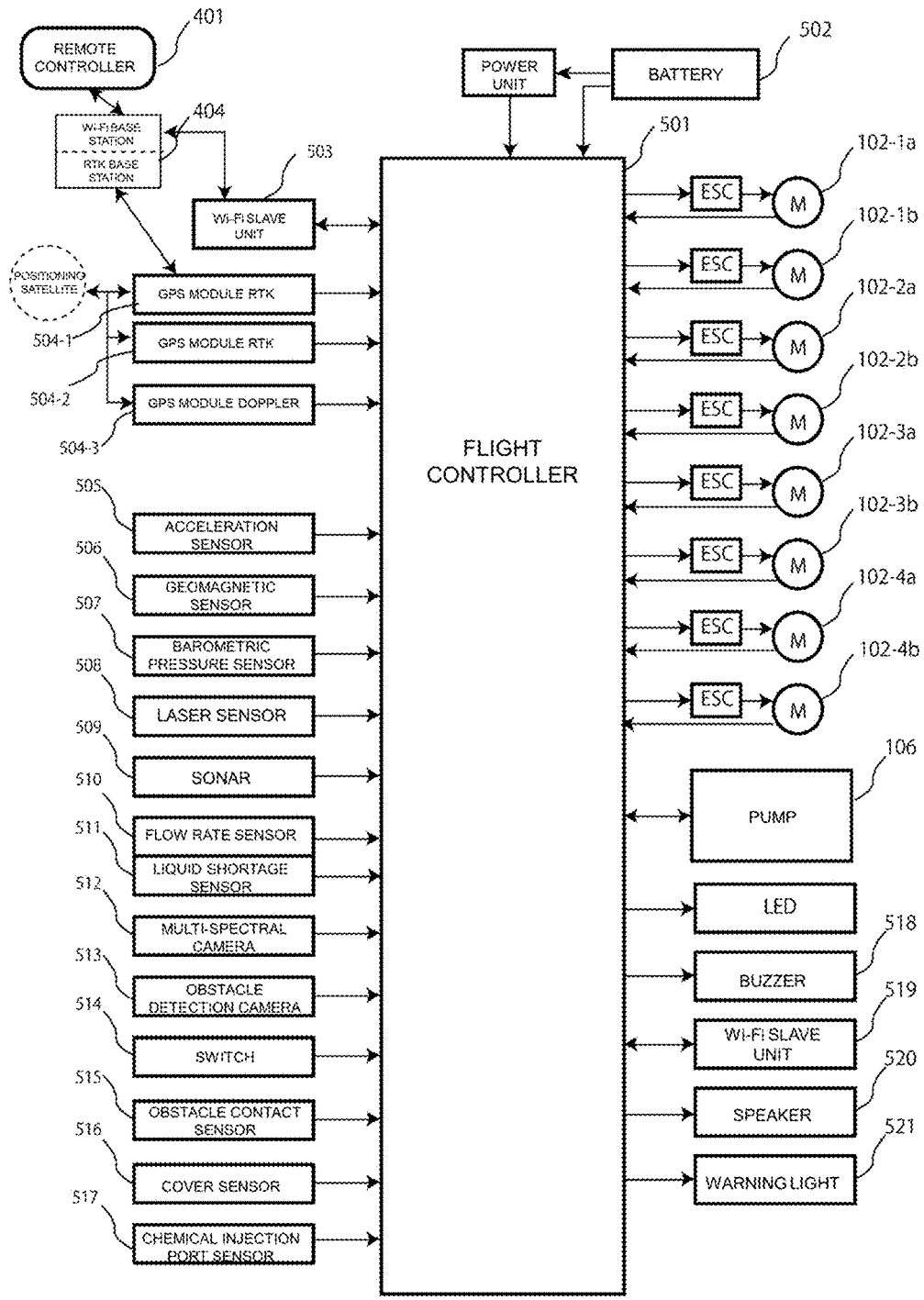
FIG. 5 is a schematic diagram illustrating a control function of the embodiment of the drone according to the present invention.

FIG. 5 is a schematic diagram illustrating a control function of the embodiment of the chemical spraying drone according to the present invention. A flight controller (501) is a component which controls the entire drone, and specifically may be an embedded computer including a CPU, memory, related software, and the like. The flight controller (501) controls the flight of the drone (100) by controlling the rotation speed of the motors (102-1a, 102-1b, 102-2a, 102-2b, 102-3a, 102-3b, 104-a, and 104-b) with control means such as electronic speed control (ESC) on the basis of the input information received from the remote controller (401) and the input information obtained from various sensors described later. It is desirable to have a configuration that the actual rotation speed of the motors (102-1a, 102-1b, 102-2a, 102-2b, 102-3a, 102-3b, 104-a, and 104-b) is fed back to the flight controller (501) to monitor whether or not a normal rotation is performed. Alternatively, the rotor blade (101) may be provided with an optical sensor or the like so that the rotation of the rotor blade (101) is fed back to the flight controller (501).

The software used by the flight controller (501) is preferably rewritable through a storage medium or the like for function expansion/change, problem correction, or the like, or through communication means such as Wi-Fi communication or USB. In this case, it is desirable that the protection by encryption, checksum, electronic signature, virus check software, and the like prevents rewriting performed by unauthorized software. In addition, a part of a calculation process used in the control by the flight controller (501) may be executed by another computer existing on the remote controller (401), the farm cloud (405), or another place. Since the flight controller (501) is highly important, some or all of the components thereof may be duplexed.

A battery (502) is a unit which supplies power to the flight controller (501) and other components of the drone, and is desirably rechargeable. The battery (502) is desirably connected to the flight controller (501) via a fuse or a power supply unit including a circuit breaker or the like. The battery (502) is desirably a smart battery which has a function of transmitting the internal state (such as the amount of stored electricity and accumulated usage time) of the battery to the flight controller (501) in addition to a power supply function.

Desirably, the flight controller (501) interacts with the remote controller (401) via a Wi-Fi slave unit function (503) and further via the base station (404) so as to receive a necessary command from the remote controller (401) and transmit necessary information to the remote controller (401). In this case, it is desirable to encrypt the communication so as to prevent illegal acts such as interception, spoofing, and hijacking of equipment. The base station (404) desirably has an RTK-GPS base station function in addition to a Wi-Fi communication function. By combining a signal from the RTK base station and a signal from a GPS positioning satellite, a GPS module (504) can measure the absolute position of the drone (100) with an accuracy of about several centimeters. Since the GPS module (504) is highly important, it is desirable to duplex and multiplex the GPS module (504). Further, in order to cope with the failure of a specific GPS satellite, each of redundant GPS modules (504) is desirably controlled to use another satellite.

An acceleration sensor (505) is a unit which measures the acceleration of a drone body (further, a unit which calculates a speed by integrating the acceleration), and is desirably a six-axis sensor. A geomagnetic sensor (506) is a unit which measures the direction of the drone body by measuring geomagnetism. A barometric pressure sensor (507) is a unit which measures atmospheric pressure, and can indirectly measure the altitude of the drone. A laser sensor (508) is a unit which measures a distance between the drone body and the ground surface by utilizing the reflection of laser light, and desirably uses an IR (infrared) laser. A sonar (509) is a unit which measures the distance between the drone body and the ground surface by utilizing the reflection of sound waves such as ultrasonic waves. These sensors may be selected according to the cost target and performance requirements of the drone. Further, a gyro sensor (angular velocity sensor) for measuring the tilt of the airframe, a wind force sensor for measuring wind force, and the like may be added. Further, it is desirable that these sensors be duplexed or multiplexed. Ina case where there are multiple sensors for the same purpose, the flight controller (501) may use only one of the sensors, and when the sensor fails, the sensor may be switched to use an alternative sensor. Alternatively, a plurality of sensors may be used at the same time, and a case where respective measurement results do not match may be considered that a failure occurs.

A flow rate sensor (510) is a unit for measuring the flow rate of the chemicals, and the flow rate sensors are desirably provided at a plurality of places on the path from the chemical tank (104) to the chemical nozzle (103). A liquid shortage sensor (511) is a sensor which detects that the amount of the chemicals is equal to or less than a predetermined amount. A multi-spectral camera (512) is a unit which photographs the farm field (403) and obtains data for image analysis. An obstacle detection camera (513) is a camera for detecting drone obstacles. The obstacle detection camera has different image characteristics and lens direction from those of the multi-spectral camera (512), so that it is desirable that the obstacle detection camera is different from the multi-spectral camera (512). A switch (514) is a unit for the user (402) of the drone (100) to make various settings. An obstacle contact sensor (515) is a sensor for detecting that the drone (100), particularly, a rotor or a propeller guard part thereof is in contact with an obstacle such as an electric wire, a building, a human body, a standing tree, a bird, or other drone. A cover sensor (516) is a sensor which detects that an operation panel of the drone (100) and a cover for internal maintenance are open. A chemical injection port sensor (517) is a sensor which detects that the injection port of the chemical tank (104) is open. These sensors may be selected according to the cost target and performance requirements of the drone and may be duplexed or multiplexed. Further, a sensor may be provided at the base station (404) outside the drone (100), the remote controller (401), or other places, and the read information may be transmitted to the drone. For example, a wind force sensor may be provided in the base station (404), and information regarding wind force and a wind direction may be transmitted to the drone (100) via Wi-Fi communication.

The flight controller (501) transmits a control signal to the pump (106) to adjust the discharging amount of the chemicals and stop the chemical discharging. It is desirable that the current status (for example, the rotation speed) of the pump (106) is fed back to the flight controller (501).

An LED is a display unit for notifying a drone operator of the state of the drone. Instead of or in addition to the LED, a display unit such as a liquid crystal display may be used. A buzzer (518) is an output unit for notifying a drone state (particularly an error state) by an audio signal. A Wi-Fi slave unit function (519) is an optional component for communicating with an external computer or the like for the transfer of software, for example, separately from the remote controller (401). Instead of or in addition to the Wi-Fi slave unit function, another wireless communication means such as infrared communication, Bluetooth (registered trademark), ZigBee (registered trademark), and NFC or wired communication means such as USB connection may be used. A speaker (520) is an output unit for notifying the drone state (particularly an error state) by the recorded human voice, synthesized voice, or the like. Depending on the weather conditions, it may be difficult to see the visual display of the drone (100) in flight, and in such a case, it is effective to communicate the situation by voice. A warning light (521) is a display unit such as a strobe light for notifying the drone state (particularly an error state). These input/output units may be selected according to the cost target and performance requirements of the drone and may be duplexed or multiplexed.

The drone according to the present invention is premised on an operation by non-specialists. In this case, it is important to provide a safety mechanism, or "a foolproof mechanism", that prevents operations leading to dangerous situations although humans make mistakes on operations of a machinery, or the machinery has an abnormality or a failure. Therefore, the drone according to the present invention provide an interlock control as describes below.

(Dealing with Mistakes of User Input Information)

The drone (100) according to the present invention is desirable to spray chemicals or the like based on a farm field topography data prepared in advance. The farm field topography data is preferably described in a geographic coordinate system used by GPS. The farm field topography data is preferably consolidated on the farm cloud, downloaded at take-off the drone (100), and stored in a memory of the flight controller (501). However, the farm field topography data may be managed locally on the memory of the flight controller (501) by using a storage medium, such as an USB memory. The farm field topography data preferably includes traffics and pathways around a target farm field in addition to the target farm field data for chemical spraying. Furthermore, it is desirable to include information on obstacles, such as utility poles, overhead wires, power lines, trees, houses, and warehouses. Further, the farm field topography data preferably includes information related to an intrusion pathway. The intrusion pathway may be registered when data is input to the farm cloud, or the user (402) may input via the remote controller (402) before the drone (100) takes off.

The flight controller (501) of the drone (100) according to the present invention preferably prohibits take-off (does not transmit rotation command to the motor (102)) when the position measured by the GPS (504) at take-off is out of a range described in the stored farm field topography data. Flying the drone (100) without knowing what is on the way to the target farm field increases a risk of accidents. When such a situation occurs, an error message is preferably displayed on the remote controller (401) to encourage the drone (100) to move into an area of the farm field topography data. Further, in this case, the flight controller (501) may allow a mode without flight (for example, a maintenance work or a replenishment of chemicals).

The flight controller (501) of the drone (100) according to the present invention preferably prohibits take-off (does not transmit rotation command to the motor (102)) when it becomes clear from the stored farm field topography data that an area (a traffic or a pathway), where people and cars may pass, is on the intrusion pathway during takeoff. Similarly, the flight controller (501) of the drone (100) according to the present invention preferably prohibits take-off (does not transmit rotation command to the motor (102)) when it becomes clear from the stored farm field topography data that obstacles, such as utility poles, overhead wires, trees, or the like, are on the intrusion pathway. When such a situation occurs, the error message is preferably displayed on the remote controller (401) to encourage the drone (100) to move into the area of the farm field topography data. Further, in this case, the flight controller (501) may allow the mode without flight (for example, the maintenance work or the replenishment of chemicals). It should be judged at the time of registration of the intrusion pathway that there are no obstacles, trafficways, or pathways, on the intrusion pathway in the first place, but it is desirable to double check with a current position of the airframe at take-off.

(Using Out of the Registered Firm Field)

The farm field topography data may be corresponded to an identification information of the drone (100) able to fly in the farm field and stored in the farm cloud (405). In this case, the flight controller (501) preferably prohibits take-off (does not transmit rotation command to the motor (102)) when own identification information and the identification of the drone that is allowed by the farm field topography data specified by the user do not match. For example, an accident is assumed that a drone for spraying herbicide is brought to the farm field where spraying pesticide is needed. When such a situation occurs, the error message is preferably displayed on the remote controller (401) to inform the situation to the user (402). In this case, the flight controller (501) may allow the mode without flight (for example, the maintenance work or the replenishment of chemicals).

(Dealing with Mistakes of the Farm Field User Selection)

In particular, a possibility of making mistakes in setting the target farm field for spraying chemicals cannot be ruled out when the user is a non-specialist. The user may misunderstand the farm field where the drone is flown to another farm field when there are many farm fields in a neighborhood. In this case, an accident may occur when the drone (100) takes off in an unexpected direction to the user or those around. In order to prevent such an accident, the flight controller (501) of the drone according to the present invention determines that a wrong farm field is specified based on a direction of the airframe measured by a magnetic sensor (506), the position of the airframe measured by the GPS (504), and the intrusion pathway information, and preferably prohibits take-off (does not transmit rotation command to the motor (102)). As an alternative, the error message may be displayed on the remote controller (401) to confirm the user (402) for take-off.

(Maintenance Period)

The drone (100) according to the present invention preferably performs regular maintenance and inspection work with the manufacture's regulations and various safety standards. In this case, a history of the maintenance work is preferably stored in a non-volatile memory of the flight controller (501) or the farm cloud (405) by controlling a switch provided on the drone (100) or the controller (401) by a person of the manufacture. In addition, the flight controller (501) may store a operation time (a time powered on), a flight time, or both in the memory. The information may be stored in the farm cloud (405). The flight controller (501) of the drone (100) according to the present invention read the history of the maintenance work at take-off and prohibits take-off (does not transmit rotation command to the motor (102)) when a predetermined standards are not met. For example, the predetermined standards are not met if more than a specified time passes from a last maintenance, or if the drone (100) is operated or flown more than a specified time from the last maintenance.

(Use in Out-of-Warranty Conditions)

The battery (502) is an extremely important component in the operation of the drone, and is a component highly like to cause an accident or a failure. Lithium-ion batteries, the mainstream technology for large-capacity batteries at present, are known to increase a risk of ignition and explosion due to a thermal runaway when they are in a high temperature state. In order to reduce this risk, the drone (100) according to the present invention includes a thermometer (or acquires a temperature information from an external device), and the flight controller (501) preferably prohibits take-off (does not transmit rotation command to the motor (102)) and prohibits starting the pump (106) when the temperature at take-off is out of warranty of the battery (502). In addition, the flight controller (501) preferably prohibits take-off (does not transmit rotation command to the motor (102)) and prohibits starting the pump (106) when the temperature of the battery (502) is out of warranty. The temperature of the battery (502) is measured by a temperature sensor provided inside of the battery (502) or a temperature sensor provided in a battery holder. In a typical case, a guaranteed operating temperature range is from 0 to 40 Celsius degrees, and a battery temperature range is from 0 to 90 Celsius degrees. Similarly, it is known that a risk of ignition or explosion increases due to destruction of an exterior when a pressure is lower than a guaranteed range. In order to reduce the risk, the drone (100) according to the present invention preferably manages the flight controller (501) to prohibit any operation or start commands and immediately shut down the system if the pressure measured by the barometric pressure sensor (507), or the altitude measured by the GPS (504) is out of warranty of the battery (502).

Figure 6:
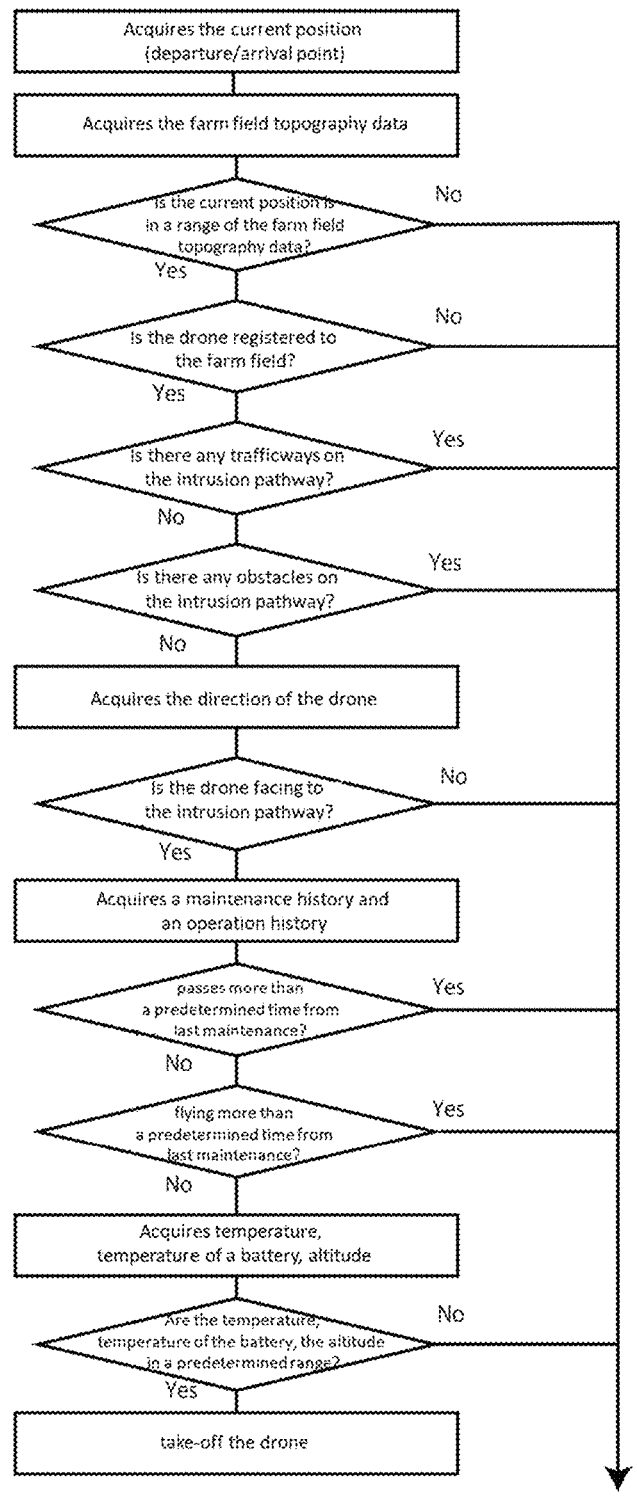
FIG. 6 is a flowchart illustrating a process during take-off of the embodiment of the drone according to the present invention.

The above explanation is summarized in the flowchart of FIG. 6. Each confirmation steps may be selected according to a target cost, purpose of use, safety standards, and like.

Hereinbefore, the embodiments of the drone for the purpose of chemical spraying are described. However, the present invention is also applied widely to agricultural drones which do not carry out chemical spraying and monitor growth with a camera, and general drones, for example.

TECHNICALLY REMARKABLE EFFECT OF PRESENT INVENTION

According to the present invention, it becomes possible to provide various foolproof mechanisms, especially for autonomous flying drones, and it becomes possible for non-specialists to use the drone safely.

The invention claimed is:

1. A drone, comprising:
a processor configured to execute a program that configures the processor to:
acquire an own direction at take-off,
compare the own direction acquired with a direction of an intrusion pathway to a target farm field specified by a user stored in a flight area information storage, and
prohibit take-off when the acquired own direction is different from the direction of the intrusion pathway to the target farm field.

2. The drone according to claim 1, further comprising: a maintenance time storage and an operation time storage, wherein the processor is further configured to:
acquire a last maintenance time from the maintenance time storage, and
prohibit take-off when a first predetermined time passes over the last maintenance time, when a second predetermined time passes over a total operation time from the last maintenance time acquired from the operation time storage, or when a second predetermined time passes over a total flight time from the last maintenance time acquired from the operation time storage.

3. The drone according to claim 1, wherein the processor is further configured to:
   compare an own identification information and an identification of the drone that is allowed by a farm field topography data specified by the user; and
   prohibit take-off when the own identification information and the identification of the drone that is allowed by the target farm field topography data specified by the user do not match.

4. The drone according to claim 1, wherein the processor is further configured to:
   acquire an own position at take-off,
   compare the acquired own position to an intrusion pathway information; and
   prohibit take-off when a trafficway is on the intrusion pathway or when an obstacle is on the intrusion pathway.

5. A drone control method, comprising the steps of:
   acquiring an own direction at take-off;
   comparing the acquired own direction with a direction of an instruction pathway to a target farm field specified by a user and stored in a flight area information storage; and
   prohibiting take-off when the acquired own direction is different from the direction of the intrusion pathway to the target farm field.

6. The drone control method according to claim 5, further comprising the steps of:
   acquiring a last maintenance time from a maintenance time storage,
   acquiring a total flight time from the last maintenance time acquired from an operation time storage, and
   prohibiting take-off when a first predetermined time passes over the last maintenance time, or when a second predetermined time passes over the total flight time from the last maintenance time acquired from the operation time storage.

7. The drone control method according to claim 5, further comprising the steps of:
   comparing an own identification information and an identification of the drone that is allowed by a farm field topography data specified by the user; and
   prohibiting take-off when the own identification information and the identification of the drone that is allowed by the farm field topography data specified by the user do not match.

8. The drone control method according to claim 5, further comprising the steps of:
   acquiring an own direction at take-off;
   comparing the acquired own position to an intrusion pathway information; and
   prohibiting take-off when a trafficway is on the intrusion pathway or when an obstacle is on the intrusion pathway.

* * * * *